United States Patent
Zou et al.

(10) Patent No.: US 11,813,675 B2
(45) Date of Patent: Nov. 14, 2023

(54) INTEGRATED DEVICE FOR PREPARING MAGNESIUM HYDRIDE POWDER AND METHOD FOR PREPARING MAGNESIUM HYDRIDE POWDER

(71) Applicant: SHANGHAI MG POWER TECHNOLOGY CO., LTD, Shanghai (CN)

(72) Inventors: Jianxin Zou, Shanghai (CN); Wenjiang Ding, Shanghai (CN)

(73) Assignee: SHANGHAI MG POWER TECHNOLOGY CO., LTD, Shanghai (CN)

(*) Notice: Subject to any disclaimer, the term of this patent is extended or adjusted under 35 U.S.C. 154(b) by 73 days.

(21) Appl. No.: 16/764,162

(22) PCT Filed: Apr. 19, 2018

(86) PCT No.: PCT/CN2018/083740
§ 371 (c)(1),
(2) Date: Oct. 23, 2020

(87) PCT Pub. No.: WO2019/095627
PCT Pub. Date: May 23, 2019

(65) Prior Publication Data
US 2021/0046550 A1    Feb. 18, 2021

(30) Foreign Application Priority Data

Nov. 16, 2017  (CN) .......................... 201711139270.0
Feb. 27, 2018  (CN) .......................... 201810161304.4

(51) Int. Cl.
*B22F 9/00*  (2006.01)
*B22F 9/08*  (2006.01)
(Continued)

(52) U.S. Cl.
CPC .............. *B22F 9/082* (2013.01); *B01J 3/006* (2013.01); *B01J 19/0013* (2013.01); *B22F 9/16* (2013.01);
(Continued)

(58) Field of Classification Search
CPC .......................... B22F 9/08; B22F 2002/0824; B22F 2201/10; B22F 2999/00; B22F 9/082; B01J 2/18; B01J 3/006; B01J 19/0013
See application file for complete search history.

(56) References Cited

U.S. PATENT DOCUMENTS 2,994,587 A  *  8/1961  Vose .......................... C01B 6/04
                                                          423/647
2013/0171057 A1  7/2013  Brown, Jr.
(Continued)

FOREIGN PATENT DOCUMENTS

CA    2902060 A1    9/2014
CN    1775428 A     5/2006
(Continued)

OTHER PUBLICATIONS

PCT; App. No. PCT/CN2018/083740; International Search Report and Written Opinion dated Aug. 1, 2018.
(Continued)

*Primary Examiner* — Thu-Khanh T. Nguyen
(74) *Attorney, Agent, or Firm* — Fitch, Even, Tabin & Flannery, LLP

(57) ABSTRACT

Provided is an integrated device for preparing magnesium hydride powder and a method for preparing magnesium hydride powder. The device comprises a heating chamber for heating a magnesium-based metal material to produce metal droplets; a powder-making chamber comprising an atomizing means used for atomizing the metal droplets which are then cooled to form a metal powder; and a
(Continued)

reaction chamber used for performing a hydrogenation reaction on the metal powder to form the magnesium hydride powder. The device is an integrated structure monolithic with a simple structure and a convenient operation; and the entire process of preparing magnesium hydride powder can be completed in this single device and can realize automated control. The preparation method is simple and easy to operate and produces a product that has a moderate size, uniform particles, and excellent performance.

24 Claims, 4 Drawing Sheets

(51) Int. Cl.
  *C01B 6/04* (2006.01)
  *B01J 19/00* (2006.01)
  *B22F 9/16* (2006.01)
  *B01J 3/00* (2006.01)

(52) U.S. Cl.
  CPC .......... *C01B 6/04* (2013.01); *B22F 2009/084* (2013.01); *B22F 2009/086* (2013.01); *B22F 2009/0824* (2013.01); *B22F 2009/0892* (2013.01); *B22F 2201/013* (2013.01); *B22F 2201/10* (2013.01); *B22F 2301/058* (2013.01); *B22F 2998/10* (2013.01)

(56) References Cited

U.S. PATENT DOCUMENTS

| | | | | |
|---|---|---|---|---|
| 2013/0236582 | A1* | 9/2013 | Liu | B22F 9/08 425/7 |
| 2017/0008082 | A1* | 1/2017 | Chen | B22F 1/105 |

FOREIGN PATENT DOCUMENTS

| | | |
|---|---|---|
| CN | 101117211 A | 2/2008 |
| CN | 101767773 A | 7/2010 |
| CN | 102583244 A | 7/2012 |
| CN | 104550990 A | 4/2015 |
| CN | 104649230 A | 5/2015 |
| CN | 105189339 A | 12/2015 |
| CN | 105883731 A | 8/2016 |
| JP | 2013023406 | 2/2013 |
| KR | 20120055866 A | 6/2012 |

OTHER PUBLICATIONS

Boyun Huang, et al., China's Strategic Emerging Industry: New Materials Rare Earth Hydrogen Storage Materials, Railway Press, China, p. 94, published Apr. 30, 2017.

* cited by examiner

INTEGRATED DEVICE FOR PREPARING MAGNESIUM HYDRIDE POWDER AND METHOD FOR PREPARING MAGNESIUM HYDRIDE POWDER

CROSS-REFERENCE TO RELATED APPLICATIONS

This application is a U.S. national phase application of International Application No. PCT/CN2018/083740, filed Apr. 19, 2018, which claims priority to Chinese Application No. 201711139270.0, filed Nov. 16, 2017, and Chinese Application No. 201810161304.4, filed Feb. 27, 2018.

TECHNICAL FIELD

The present invention belongs to the field of the preparation of magnesium hydride, and in particular relates to an integrated device for preparing magnesium hydride powder and a method for preparing magnesium hydride powder.

BACKGROUND ART

In the face of the current situation of depletion of fossil energy resources and the huge problem of environmental pollution, the rational use of hydrogen energy provides a new solution for mankind. Hydrogen energy is highly efficient, pollution-free and renewable, and is considered to be the most promising new energy source. However, finding safe and efficient hydrogen storage materials and technologies is the main bottleneck in current applications.

Solid hydrogen storage materials have the advantages of a high energy density, a high safety, etc. Among them, magnesium-based metal materials have the advantages of a high hydrogen storage density, a good reversibility of hydrogen absorption and release, abundant resources, being environmentally friendly, etc., and are thus a class of hydrogen storage, heat storage and energy storage materials with good application prospects.

Magnesium hydride ($MgH_2$) has attracted widespread attention due to the high hydrogen storage capacity (7.6 wt %) thereof. Magnesium hydride is a single light metal hydride with a higher stability at room temperature and normal pressure. Common preparation methods therefor include thermal decomposition of an alkyl magnesium to produce magnesium hydride, catalysis of magnesium powder at normal pressure, and heating and pressurization of magnesium powder to produce magnesium hydride, etc. However, most of magnesium hydrides prepared in the prior art have larger sizes and uneven particles and are expensive; therefore, there is currently no commercial reagent supply yet, which seriously restricts the development of magnesium hydride-based high-capacity hydrogen storage materials.

On the other hand, methods in the prior art for preparing magnesium hydride by hydrogenating magnesium powder generally include the processes of powder-making, collecting, and hydrogenation, and preparation devices based on this method are usually not single-piece apparatuses, but are made up of various apparatuses to be required for completion. Since magnesium metal powder and magnesium hydride powder are very active in an aerobic and water environment, the above-mentioned processes are usually necessarily completed in an inert atmosphere with a low content of water and a low content of oxygen, e.g. in a glove box. However, it is very inconvenient to complete the operation of different apparatuses, the transfer of materials between apparatuses, and the control of reaction conditions in a glove box. Therefore, it is particularly important to provide an integrated magnesium hydride powder preparation device that integrates the magnesium hydride preparation process into one single apparatus for completion.

SUMMARY OF THE INVENTION

In view of the above-mentioned shortcomings of the prior art, the object of the present invention is to provide an integrated device for preparing magnesium hydride powder and a method for preparing magnesium hydride powder, particularly a method for preparing magnesium hydride powder using that device. The device for preparing magnesium hydride powder of the present invention has a simple structure and a convenient operation; and the method for preparing magnesium hydride powder is simple and easy to operate and produces a product that has a moderate size, uniform particles and excellent performance.

According to a first aspect of the present invention, the present invention provides an integrated device for preparing magnesium hydride powder, the device comprising a heating chamber, a powder-making chamber, and a reaction chamber. Preferably, a collection chamber is further comprised between the powder-making chamber and the reaction chamber.

The heating chamber is used for heating a magnesium-based metal material to produce metal droplets of the magnesium-based metal material.

Furthermore, the heating chamber comprises a hatch cover, wherein when the hatch cover is opened, the heating chamber is in communication with the external environment, and the heating chamber can be charged from the external environment; and when the hatch cover is closed, the heating chamber is sealed without being in communication with the external environment. Preferably, the hatch cover is arranged on the top of the heating chamber.

Furthermore, the heating chamber is connected to a vacuum pump for evacuating the heating chamber. Preferably, the heating chamber is evacuated to a vacuum of $10^{-4}$ to $10^{-3}$ Pa.

Furthermore, the heating chamber is further connected to an inert gas pipeline for charging the heating chamber with an inert gas. On the one hand, the inert gas can protect the magnesium-based metal material, and on the other hand, it can provide the pressure in the heating chamber. When the pressure is too low, an appropriate amount of the inert gas can be charged, and when the pressure is too high, an appropriate amount of the inert gas can be pumped out by a vacuum pump. Preferably, the inert gas is selected from one of or a combination of some of helium, neon, argon, krypton, and xenon. More preferably, the inert gas is argon. Preferably, the pressure of the heating chamber during heating is 0.5-1.5 atm.

Furthermore, the heating chamber further comprises a first container for containing the magnesium-based metal material. The magnesium-based metal material is selected from one of or a combination of some of pure magnesium, a magnesium-nickel alloy, a magnesium-aluminum alloy, and a magnesium-rare earth alloy, wherein the alloy has a magnesium content between 60 wt % and 99.9 wt % and a content of other elements between 0.1 wt % and 40 wt %. The first container is made of a material that is heat-resistant and does not react with the magnesium-based metal material at high temperatures, such as boron nitride, graphite, magnesium oxide, or stainless steel. Preferably, the first container is a crucible.

Furthermore, a heating means is provided around and/or under the first container for heating the magnesium-based metal material. Preferably, the heating means is an induction or resistance heating coil, which heats same by means of inductance or resistance when energized to melt the magnesium-based metal material in the first container or maintain the magnesium-based metal material in a molten state, with the heating temperature being 650-1100° C.

Furthermore, the first container is further connected to a droplet forming member for forming the metal droplets from the magnesium-based metal material melted or molten in the first container. Preferably, the droplet forming member is connected to the bottom of the first container and has a tip with a diameter of 2-5 mm. More preferably, the droplet forming member is a tip nozzle formed at the bottom of the first container. For example, where the first container is a crucible, the crucible is a crucible with a tip nozzle at the bottom. Optionally, there may be one droplet forming member, or may also be two or more droplet forming members, or there is one droplet forming member, but it has multiple tips.

The powder-making chamber is used for forming the metal droplets of the magnesium-based metal material into a metal powder. Preferably, the metal droplets are formed into the metal powder in such a manner that the metal droplets are atomized by using a high-pressure inert gas and condensed into the metal powder by means of a cooling system.

Furthermore, the powder-making chamber is connected to a first duct, wherein one end of the first duct is disposed inside a cavity of the powder-making chamber and provided with an atomizing means. Preferably, the atomizing means is a tip nozzle arranged at one end of the first duct, and the atomizing means is arranged near, e.g. below and on one side of, the tip of the droplet forming member, so that the high-pressure inert gas blown out from the tip of the first duct atomizes the metal droplets dripping from the tip of the droplet forming member. Preferably, the direction pointed by the tip nozzle of the first duct and the direction pointed by the tip of the droplet forming member are perpendicular to each other. Preferably, the number of the tip nozzles of the first duct is the same as the number of the tips of the droplet forming member. The other end of the first duct is disposed outside the cavity of the powder-making chamber and connected to a gas outlet of a compressor, with the compressor being used for compressing the inert gas to form the high-pressure inert gas. For example, where the inert gas is argon, the compressor is an argon compressor. Preferably, the pressure of the high-pressure inert gas is 1-15 MPa during atomization.

Furthermore, a cooling system is comprised around the cavity of the powder-making chamber to condense the atomized metal droplets into a metal powder. Preferably, the cooling system is a cooling water system sleeved around the cavity of the powder-making chamber, and the cooling water system has a cooling water inlet and a cooling water outlet which are arranged one above the other. Preferably, the cooling water outlet is above and the cooling water inlet is below. Of course, vice versa. Preferably, the cooling water has a temperature of 20-50° C. and a pressure of 0.5-2 MPa.

The collection chamber is used for screening and collecting the metal powder formed in the powder-making chamber so as to obtain a metal powder within a specified particle size range, thereby making the particle size of the prepared magnesium hydride powder more uniform.

Furthermore, the collection chamber comprises a first valve arranged between the powder-making chamber and the collection chamber, wherein when the first valve is opened, the collection chamber is in communication with the powder-making chamber; and when the first valve is closed, the collection chamber is isolated from the powder-making chamber. Preferably, the first valve is located at the bottom of the powder-making chamber and the top of the collection chamber.

Furthermore, a vibratile sieve is provided inside the collection chamber for screening the metal powder obtained in the powder-making chamber in order to obtain magnesium powder within a specified particle size range. The sieve divides the collection chamber into upper and lower parts, wherein powder with a particle size larger than the mesh aperture is left in the upper part of the sieve, while powder with a particle size smaller than the mesh aperture can fall through the sieve aperture to the lower part of the sieve. Preferably, the sieve has a mesh aperture of 100-1000 mesh. The sieve is provided with a vibrating means, which can speed up the screening of the powder by vibrating the sieve.

Furthermore, a second duct is connected between the collection chamber and the compressor for recovering and recycling the inert gas. Thus, the inert gas can form a cycle of "the gas outlet of the compressor—the first duct—the powder-making chamber—the collection chamber—the second duct—the gas inlet of the compressor", so that the pressure of the inert gas in the powder-making chamber and the collection chamber can be adjusted by adjusting the gas inlet and outlet of the compressor. For example, when the pressure is too high, the gas inlet of the compressor can be opened larger and/or the gas outlet of the compressor can be opened smaller; and when the pressure is too small, the gas inlet of the compressor can be opened smaller and/or the gas outlet of the compressor can be opened larger. Preferably, the pressure in the powder-making chamber is 0.02-0.1 MPa during powder-making. The second duct is provided with a filter screen for filtering out the metal powder from the inert gas before entering the gas inlet of the compressor. Preferably, the filter screen is of at least 1600 mesh. Preferably, the filter screen is installed at an end of the second duct, which is connected to the collection chamber, and is located on a side of the collection chamber.

The reaction chamber is used for hydrogenating the metal powder within the specified particle size range obtained in the collection chamber to form magnesium hydride powder.

Furthermore, the reaction chamber comprises a second valve arranged between the collection chamber and the reaction chamber, wherein when the second valve is opened, the collection chamber is in communication with the reaction chamber; and when the second valve is closed, the collection chamber is isolated from the reaction chamber. Preferably, the second valve is located at the bottom of the collection chamber and the top of the reaction chamber.

Furthermore, the reaction chamber comprises a hydrogen gas inlet that is connected to a hydrogen source used for supplying hydrogen required for the reaction of hydrogenating the magnesium powder into magnesium hydride to the reaction chamber and forming a hydrogen pressure. Preferably, the hydrogen gas inlet is arranged on a side wall of a cavity of the reaction chamber.

Furthermore, a thermal insulation means is further provided around the cavity of the reaction chamber for providing the temperature required for the reaction of hydrogenating the magnesium powder into magnesium hydride. Preferably, the thermal insulation means comprises a heating resistance wire. Preferably, during hydrogenation, the hydrogen pressure is 0.5-5 MPa, the hydrogenation temperature is 200-450° C., and the hydrogenation time is 1-40 h.

Preferably, the device for preparing magnesium hydride powder of the present invention further comprises a first control power supply that is connected to the heating means in the heating chamber and is used for controlling the current delivered to the heating means to thereby control the heating power of the heating means.

Preferably, the device for preparing magnesium hydride powder of the present invention further comprises a second control power supply that is connected to the thermal insulation means of the reaction chamber and is used for controlling the current of the heating resistance wire in the thermal insulation means to thereby control the heating power of the heating resistance wire.

Preferably, the device for preparing magnesium hydride powder of the present invention further comprises other control power supplies for controlling the vacuum pump, the compressor, the cooling system, automatic switches for the first and second valves, and the vibration of the sieve.

Preferably, the device for preparing magnesium hydride powder of the present invention further comprises a control system for controlling the above-mentioned control power supplies in order to realize automatic control of the entire device.

According to a second aspect of the present invention, the present invention provides a method for preparing magnesium hydride powder, particularly a method for preparing magnesium hydride powder using the device of the present invention.

The method for preparing magnesium hydride powder of the present invention comprises the following steps:

(1) heating a magnesium-based metal material in an inert gas atmosphere to produce metal droplets;

(2) atomizing the metal droplets produced in step (1) and cooling same to form a metal powder; and (3) hydrogenating the metal powder obtained in step (2) to form the magnesium hydride powder.

Furthermore, step (2) may further comprise screening the metal powder to obtain a screened metal powder.

Preferably, the inert gas in step (1) is selected from one of or a combination of some of helium, neon, argon, krypton, and xenon. More preferably, the inert gas is argon.

Preferably, the magnesium-based metal material in step (1) is selected from one of or a combination of some of pure magnesium, a magnesium-nickel alloy, a magnesium-aluminum alloy, and a magnesium-rare earth alloy, wherein the alloy has a magnesium content between 60 wt % and 99.9 wt % and a content of other elements between 0.1 wt % and 40 wt %.

Preferably, the heating temperature in step (1) is 650-1100° C.

Preferably, the atomization in step (2) means atomizing the metal droplets by means of a high-pressure inert gas.

Furthermore, the high-pressure inert gas is selected from one of or a combination of some of helium, neon, argon, krypton, and xenon. More preferably, the high-pressure inert gas is argon.

Preferably, the pressure of the high-pressure inert gas in step (2) is 1-15 MPa.

Preferably, the screening in step (2) is carried out by means of a sieve that has a mesh aperture of 100-1000 mesh.

Preferably, in step (4), the hydrogen pressure is 0.5-5 MPa, the hydrogenation temperature is 200-450° C., and the hydrogenation time is 1-40 h.

The method for preparing magnesium hydride powder using the device of the present invention comprises the following steps:

(a) opening the hatch cover of the heating chamber, putting a magnesium-based metal material into the first container, closing the hatch cover, evacuating same, and charging same with an inert gas; and energizing the heating means for heating to make the magnesium-based metal material in the first container melt and maintain the molten state;

(b) enabling the molten metal to pass through the droplet forming member to form metal droplets and let flow out into the powder-making chamber in which the metal droplets are atomized by the high-pressure inert gas and cooled by the cooling system to form a metal powder;

(c) allowing the metal powder formed in step (2) to fall on the sieve of the collection chamber, and powder screened through the sieve to fall into the reaction chamber; and (d) closing the second valve, charging the reaction chamber with hydrogen via the hydrogen gas inlet with the hydrogen pressure, hydrogenation temperature and hydrogenation time being controlled, and after the hydrogenation reaction is completed, collecting the magnesium hydride powder from the reaction chamber.

Preferably, the magnesium-based metal material in step (a) is selected from one of or a combination of some of pure magnesium, a magnesium-nickel alloy, a magnesium-aluminum alloy, and a magnesium-rare earth alloy, wherein the alloy has a magnesium content between 60 wt % and 99.9 wt % and a content of other elements between 0.1 wt % and 40 wt %.

Preferably, the inert gas in step (a) is selected from one of or a combination of some of helium, neon, argon, krypton, and xenon. More preferably, the inert gas is argon.

Preferably, the first container in step (a) is a crucible made of boron nitride, graphite, magnesium oxide, or stainless steel, with the bottom of the crucible having a tip nozzle with a diameter of 2-5 mm.

Preferably, the steps of evacuating and charging with the inert gas in step (a) are repeated twice or more, more preferably 3 times. The heating chamber is evacuated to a vacuum of $10^{-4}$ to $10^{-3}$ Pa, and charged with the inert gas until the pressure therein is 0.5-1.5 atm.

Preferably, the heating temperature in step (a) is 650-1100° C.

Preferably, the high-pressure inert gas in step (b) is selected from one of or a combination of some of helium, neon, argon, krypton, and xenon. More preferably, the high-pressure inert gas is argon.

Preferably, the pressure in the powder-making chamber in step (b) is 0.02-0.1 MPa.

Preferably, the pressure of the high-pressure inert gas in step (b) is 1-15 MPa.

Preferably, the cooling water in the cooling system in step (b) has a temperature of 20-50° C. and a pressure of 0.5-2 MPa.

Preferably, the sieve in step (c) is of 100-1000 mesh.

Preferably, in step (d), the hydrogen pressure is 0.5-5 MPa, the hydrogenation temperature is 200-450° C., and the hydrogenation time is 1-40 h.

The beneficial technical effects of the present invention are at least reflected in the following several aspects:

(1) The device for preparing magnesium hydride powder of the present invention is an integrated monolithic structure with a simple structure and a convenient operation; and the entire process of preparing the magnesium hydride powder can be completed in this single device and can realize automated control.

(2) The method for preparing magnesium hydride powder of the present invention is simple and easy to operate and produces a product that has a moderate size, uniform particles and excellent performance.

The technical solution of the present invention will be further illustrated below in conjunction with the drawings and specific embodiments.

Figure 1:
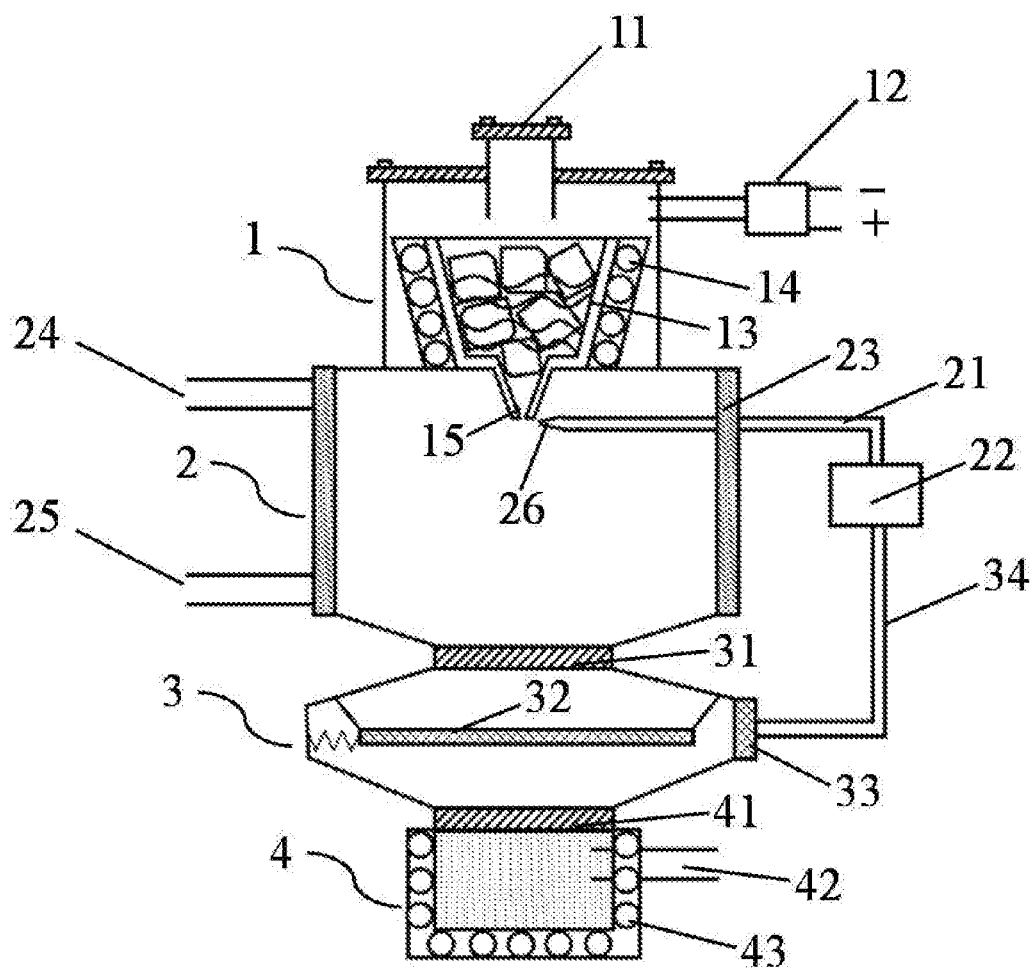
FIG. 1 is a schematic structural view of an integrated device for preparing magnesium hydride powder according to a preferred embodiment of the present invention.

In the drawings, 1—heating chamber, 11—hatch cover, 12—vacuum pump, 13—first container, 14—heating means, and 15—droplet forming member; 2—powder-making chamber, 21—first duct, 22—compressor, 23—cooling system, 24—cooling water outlet, 25—cooling water inlet, and 26—atomizing means; 3—collection chamber, 31—first valve, 32—sieve, 33—filter screen, and 34—second duct; and 4—reaction chamber, 41—second valve, 42—hydrogen gas inlet, and 43—thermal insulation means.

DETAILED DESCRIPTION OF EMBODIMENTS

The embodiments of the present invention are described in detail below. The following embodiments are implemented on the premise of the technical solutions of the present invention, and detailed embodiments and specific operation procedures are given; however, the scope of protection of the present invention is not limited to the following embodiments.

FIG. 1 is a schematic structural view of an integrated device for preparing magnesium hydride powder according to a preferred embodiment of the present invention, the device comprising a heating chamber 1, a powder-making chamber 2, a collection chamber 3, and a reaction chamber 4.

In the device, the heating chamber 1 is used for heating a magnesium-based metal material to produce metal droplets of the magnesium-based metal material. The heating chamber comprises a hatch cover 11 arranged on the top of the heating chamber 1. The heating chamber 1 is connected to a vacuum pump 12 for evacuating the heating chamber 1. The heating chamber 1 is further connected to an inert gas pipeline (not shown in the figure) for charging the heating chamber 1 with an inert gas. The heating chamber 1 further comprises a first container 13, wherein the first container 13 is a crucible for containing the magnesium-based metal material. A heating means 14 is provided around the first container 13, and the heating means 14 is an induction or resistance heating coil used for heating the magnesium-based metal material. The first container 13 is further connected to a droplet forming member 15 for forming the metal droplets from the magnesium-based metal material melted or molten in the first container 13. The droplet forming member 15 is a tip nozzle formed at the bottom of the first container 13, that is, the first container 13 is a crucible with a tip nozzle at the bottom.

The powder-making chamber 2 is used for forming the metal droplets of the magnesium-based metal material into a metal powder. The powder-making chamber 2 is connected to a first duct 21, with one end of the first duct 21 being located inside a cavity of the powder-making chamber 2, and is provided with an atomizing means 26, which is a tip nozzle, wherein the atomizing means 26 is arranged near, and below and on one side of, the droplet forming member 15, so that the high-pressure inert gas blown out therefrom atomizes the metal droplets dripping from the tip of the droplet forming member 15. The direction pointed by the tip nozzle of the first duct 21 and the direction pointed by the tip of the droplet forming member 15 are perpendicular to each other. The other end of the first duct 21 is disposed outside the cavity of the powder-making chamber 2 and connected to a gas outlet of a compressor 22, with the compressor 22 being used for compressing the inert gas to form the high-pressure inert gas. Where the inert gas is argon, the compressor 22 is an argon compressor. A cooling system 23 is comprised around the cavity of the powder-making chamber 2 to condense the atomized metal droplets into a metal powder. The cooling system 23 is a cooling water system sleeved around the cavity of the powder-making chamber 2, and the cooling water system 23 has a cooling water outlet 24 and a cooling water inlet 25, wherein the cooling water outlet 24 is above and the cooling water inlet 25 is below.

The collection chamber 3 is used for screening and collecting the metal powder formed in the powder-making chamber 2 so as to obtain a metal powder within a specified particle size range, thereby making the particle size of the prepared magnesium hydride powder more uniform. The collection chamber 3 comprises a first valve 31, wherein the first valve 31 is arranged between the powder-making chamber 2 and the collection chamber 3 and is located at the bottom of the powder-making chamber 2 and the top of the collection chamber 3. A vibratile sieve 32 is provided inside the collection chamber 3 for screening the metal powder obtained in the powder-making chamber in order to obtain magnesium powder within a specified particle size range. The sieve 32 divides the collection chamber 3 into upper and lower parts, wherein powder with a particle size larger than the mesh aperture is left in the upper part of the sieve 32, while powder with a particle size smaller than the mesh aperture can fall through the sieve aperture to the lower part of the sieve 32. The sieve 32 is provided with a vibrating means, which can speed up the screening of the powder by vibrating the sieve 32. A second duct 34 is connected between the collection chamber 3 and the compressor 22 for recovering and recycling the inert gas. Therefore, the inert gas can form a cycle of "the gas outlet of the compressor 22—the first duct 21—the powder-making chamber 2—the collection chamber 3—the second duct 34—the gas inlet of the compressor 22", so that the pressure of the inert gas in the powder-making chamber 2 and the collection chamber 3 can be adjusted by adjusting the gas inlet and outlet of the compressor 22. The second duct 34 is provided with a filter screen 33 for filtering out the metal powder from the inert gas before entering the gas inlet of the compressor 22. The filter screen 33 is installed at an end of the second duct 34, which is connected to the collection chamber 3, and is located on a side of the collection chamber 3.

The reaction chamber 4 is used for hydrogenating the metal powder within the specified particle size range obtained in the collection chamber 3 to form magnesium hydride powder. The reaction chamber 4 comprises a second valve 41, wherein the second valve 41 is arranged between the collection chamber 3 and the reaction chamber 4 and is located at the bottom of the collection chamber 3 and the top of the reaction chamber 4. The reaction chamber 4 comprises a hydrogen gas inlet 42, wherein the hydrogen gas inlet 42 is connected to a hydrogen source (not shown in the figure) used for supplying hydrogen required for the reaction of hydrogenating the magnesium powder into magnesium hydride to the reaction chamber 4 and forming a hydrogen pressure. The hydrogen gas inlet 42 is arranged on a side wall of a cavity of the reaction chamber 4. A thermal insulation means 43 is further provided around the cavity of the reaction chamber 4, and the thermal insulation means comprises a heating resistance wire used for providing the temperature required for the reaction of hydrogenating the magnesium powder into magnesium hydride.

The structure of an integrated device for preparing magnesium hydride powder according to a preferred embodiment of the present invention has been described above. Based on this device, the method for preparing magnesium hydride powder of the present invention will be illustrated below in detail using different embodiments.

Embodiment 1

In this embodiment, the method for preparing magnesium hydride powder using the above-mentioned integrated device involves:

(a) opening the hatch cover 11 on the top of the heating chamber 1, putting a magnesium-nickel alloy raw material block (in which the content of nickel is 5 wt %) into the graphite crucible of the first container 13, and closing the hatch cover 11; evacuating the heating chamber 1, charging same with argon, and repeating once; and evacuating same again to a vacuum of $10^{-3}$ Pa, then charging the heating chamber 1 with 0.06 MPa argon, and heating the graphite crucible to 800° C. by controlling the heating means 14 so that the magnesium-nickel alloy raw material in the crucible is melted to form a molten metal;

(b) allowing the molten metal to flow out through the tip nozzle at the bottom of the crucible into the powder-making chamber 2 in which the molten metal is atomized into powder droplets by a 5 MPa high-pressure argon gas and cooled into a metal powder under the action of 2 MPa circulating cooling water at 20° C.;

(c) allowing the metal powder to fall through the bottom of the powder-making chamber 2 on the 400 mesh vibratile sieve 32 in the collection chamber 3; and (d) after the sieved powder falls into the reaction chamber 4, closing the second valve 41, maintaining the reaction chamber 4 at 360° C., and introducing 3 MPa hydrogen to start hydrogenation; and after the hydrogenation is completed over 10 h, collecting the product magnesium hydride powder from the reaction chamber 4.

Figure 2:
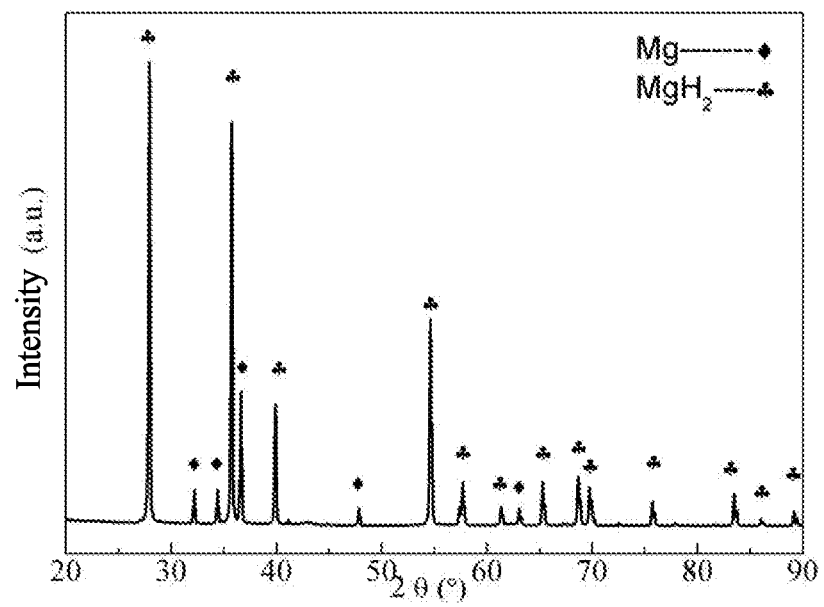
FIG. 2 is an XRD chart of magnesium hydride powder prepared in a preferred embodiment of the present invention.

An XRD test is carried out on the powder prepared in this embodiment, and as shown in FIG. 2, there are clear and complete $MgH_2$ crystal surface characteristic peaks and a small number of Mg characteristic peaks, indicating that only a small amount of Mg is not hydrogenated and the prepared magnesium hydride powder has a higher purity, that is, the $MgH_2$ content thereof is high.

Figure 3:
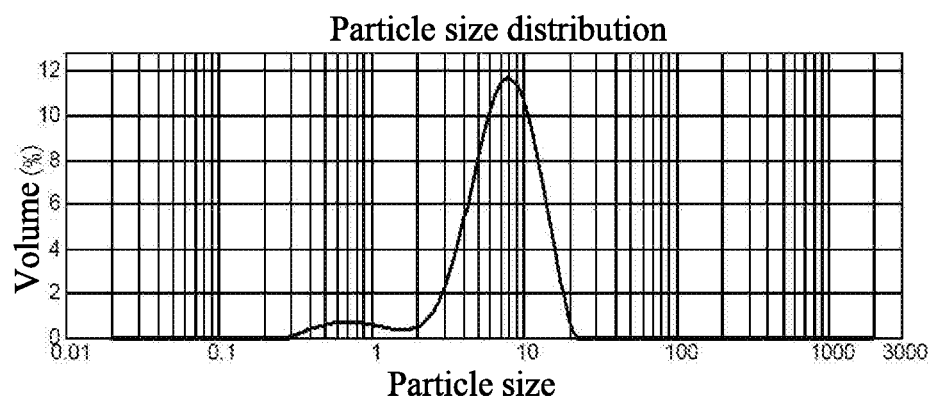
FIG. 3 is a particle size distribution diagram of a sample powder prepared in a preferred embodiment of the present invention.

A nano-particle size test is carried out on the powder prepared in this embodiment, and as shown in FIG. 3, the yield of powder with a particle size of 11.25 μm or less reaches 94%, the volume average particle size of the particles is 7.87 μm, and the particle size consistency is relatively high.

Figure 4:
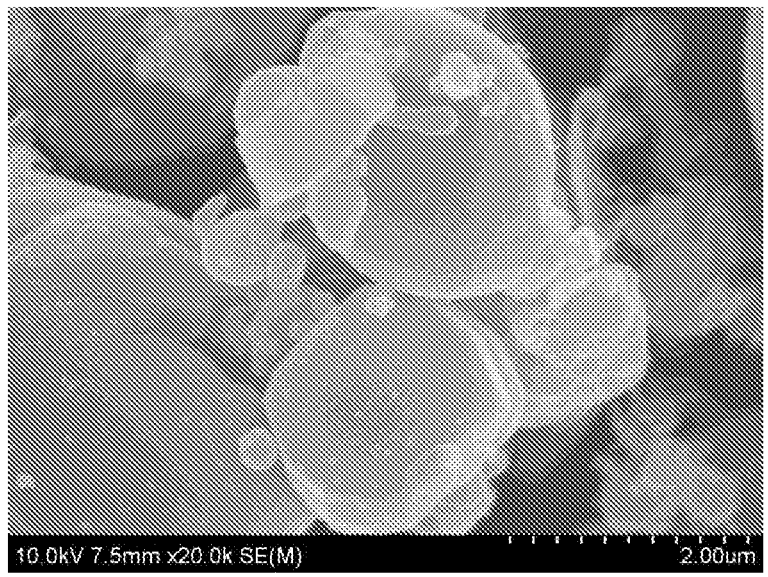
FIG. 4 is an SEM photograph of a sample powder prepared in a preferred embodiment of the present invention.
Figure 5:
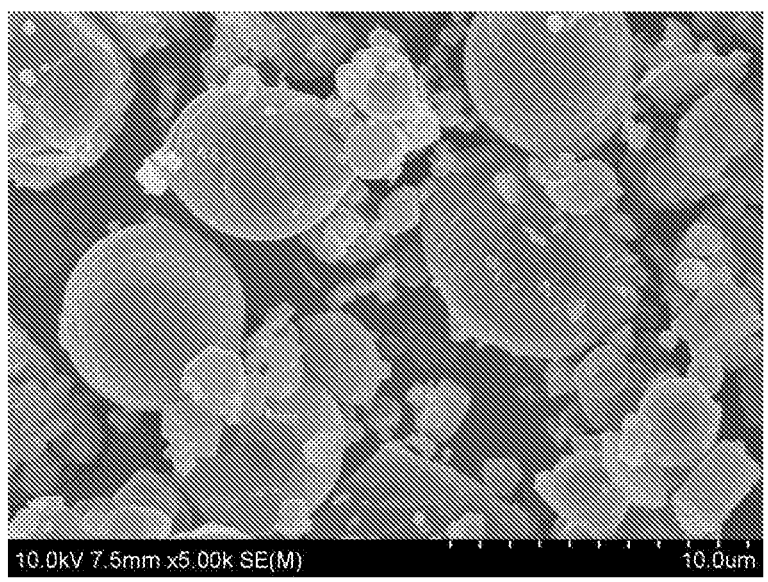
FIG. 5 is an SEM photograph of a sample powder prepared in a preferred embodiment of the present invention.

In addition, the morphology of the powder prepared in this embodiment is observed using SEM, and as shown in FIGS. 4 and 5, the powder is shown to be more uniform and have a good sphericity.

Embodiment 2

The method for preparing magnesium hydride powder in this embodiment is basically the same as that in Embodiment 1, only except that:

the raw material block placed in step (a) is a magnesium-aluminum alloy (in which the content of aluminum is 3 wt %), and the heating temperature is 650° C.;

the inert gases used in step (a) and step (b) are helium, the pressure of the heating chamber 1 is 0.05 MPa, and the pressure of the high-pressure helium is 1 MPa;

the circulating cooling water in step (b) has a temperature of 50° C. and a pressure of 0.5 MPa; and in step (d), the hydrogen pressure is 1 MPa, the hydrogenation temperature is 400° C., and the hydrogenation time is 20 h.

Figure 6:
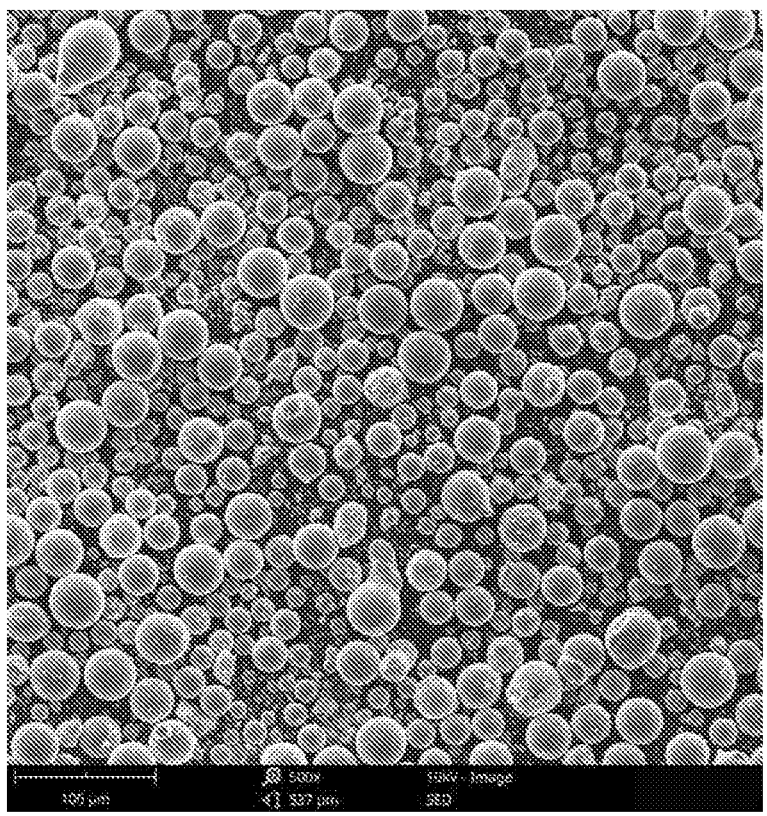
FIG. 6 is an SEM photograph of a sample powder prepared in a preferred embodiment of the present invention.

Compared with Embodiment 1, the powder prepared in this embodiment is all spherical magnesium hydride powder with a uniform size and a complete morphology, as shown in FIG. 6.

Embodiment 3

The method for preparing magnesium hydride powder in this embodiment is basically the same as that in Embodiment 1, only except that:

the raw material block placed in step (a) is pure magnesium metal, and the heating temperature is 1100° C.;

the inert gases used in step (a) and step (b) are argon, the pressure of the heating chamber 1 is 0.15 MPa, and the pressure of the high-pressure argon is 15 MPa;

the sieve in step (c) is of 200 mesh; and in step (d), the hydrogen pressure is 5 MPa, the hydrogenation temperature is 200° C., and the hydrogenation time is 40 h.

By comparing the powder prepared in this embodiment with that of Embodiment 1, the prepared magnesium hydride powder also has a higher level of purity, that is, the content of $MgH_2$ in the product is high, a higher particle diameter consistency, a rational size distribution, and a complete spherical morphology.

The preferred embodiments of the present invention have been described in detail above. It should be understood that a person of ordinary skill in the art would be able to make various modifications and variations according to the concept of the present invention without involving any inventive effort. Therefore, any technical solutions that can be obtained by a person skilled in the art based on the prior art according to the concept of the present invention through logical analysis, reasoning, or limited trials should all be within the scope of protection determined by the claims.

The invention claimed is:

1. An integrated device for preparing magnesium hydride powder, characterized in that the device comprises:

a heating chamber used for heating a magnesium-based metal material to produce metal droplets;

a powder-making chamber comprising an atomizer used for atomizing the metal droplets which are then cooled to form a metal powder; and a reaction chamber used for performing a hydrogenation reaction on the metal powder to form the magnesium hydride powder;

wherein the device further comprises a collection chamber between the powder-making chamber and the reaction chamber, and the collection chamber is used for collecting and screening the metal powder; a vibratile sieve is provided inside the collection chamber, wherein the sieve has a mesh aperture of 100-1000 mesh and vibrates for speeding up the screening of the metal powder by vibration of the sieve.

2. The device according to claim 1, characterized in that the heating chamber comprises a hatch cover, wherein when the hatch cover is opened, the heating chamber is in communication with the external environment, and the heating chamber can be charged from the external environment; and when the hatch cover is closed, the heating chamber is not in communication with the external environment.

3. The device according to claim 1, characterized in that the heating chamber is connected to a vacuum pump for evacuating the heating chamber.

4. The device of claim 3, characterized in that the heating chamber is further connected to an inert gas pipeline for charging the heating chamber with an inert gas.

5. The device of claim 4, characterized in that the inert gas is selected from one of or a combination of some of helium, neon, argon, krypton, and xenon.

6. The device according to claim 1, characterized in that the magnesium-based metal material is selected from one of or a combination of some of pure magnesium, a magnesium-nickel alloy, a magnesium-aluminum alloy, and a magnesium-rare earth alloy.

7. The device of claim 6, characterized in that the magnesium-nickel alloy, the magnesium-aluminum alloy, or the magnesium-rare earth alloy has a magnesium content between 60 wt % and 99.9 wt % and a content of other elements between 0.1 wt % and 40 wt %.

8. The device according to claim 1, characterized in that the heating chamber comprises a first container for containing the magnesium-based metal material.

9. The device of claim 8, characterized in that a heater is provided around and/or under the first container.

10. The device of claim 8, characterized in that the first container is connected to a droplet forming member for forming the metal droplets from the magnesium-based metal material melted or molten in the first container.

11. The device of claim 10, characterized in that the droplet forming member is connected to the bottom of the first container and has a tip with a diameter of 2-5 mm.

12. The device of claim 11, characterized in that the droplet forming member is a tip nozzle formed at the bottom of the first container.

13. The device according to claim 1, characterized in that the powder-making chamber further comprises a cooling system, and the atomizer atomizes the metal droplets by a high-pressure inert gas and the cooling system cools the metal droplets into the metal powder.

14. The device of claim 13, characterized in that the powder-making chamber is connected to a first duct, wherein one end of the first duct is disposed inside a cavity of the powder-making chamber and provided with the atomizer.

15. The device of claim 14, characterized in that the other end of the first duct is disposed outside the cavity of the powder-making chamber and connected to a gas outlet of a compressor, with the compressor being used for compressing the inert gas to form the high-pressure inert gas.

16. The device of claim 13, characterized in that the cooling system is a cooling water system sleeved around the cavity of the powder-making chamber, and the cooling water system has a cooling water inlet and a cooling water outlet which are arranged one above the other.

17. The device of claim 1, characterized in that the collection chamber comprises a first valve arranged between the powder-making chamber and the collection chamber, wherein when the first valve is opened, the collection chamber is in communication with the powder-making chamber; and when the first valve is closed, the collection chamber is isolated from the powder-making chamber.

18. The device of claim 17, characterized in that the first valve is located at the bottom of the powder-making chamber and the top of the collection chamber.

19. The device of claim 15, characterized in that a second duct is connected between the collection chamber and the compressor, a filter screen is provided on the second duct, and the filter screen is of at least 1600 mesh.

20. The device of claim 1, characterized in that the reaction chamber comprises a second valve arranged between the collection chamber and the reaction chamber, wherein when the second valve is opened, the collection chamber is in communication with the reaction chamber; and when the second valve is closed, the collection chamber is isolated from the reaction chamber.

21. The device of claim 20, characterized in that the reaction chamber comprises a hydrogen gas inlet that is connected to a hydrogen source.

22. The device of claim 1, characterized in that a thermal insulator is provided around the cavity of the reaction chamber, the thermal insulator comprises a heating resistance wire.

23. The device of claim 9, characterized in that the device further comprises a first control power supply that is connected to the heater.

24. The device of claim 22, characterized in that the device further comprises a second control power supply that is connected to the thermal insulator.

* * * * *